United States Patent
Cote et al.

(10) Patent No.: US 11,919,792 B2
(45) Date of Patent: Mar. 5, 2024

(54) TREATMENT OF PHOSPHATE-CONTAINING WASTEWATER WITH FLUOROSILICATE AND PHOSPHATE RECOVERY

(71) Applicant: OSTARA NUTRIENT RECOVERY TECHNOLOGIES INC., Vancouver (CA)

(72) Inventors: Pierre Cote, Dundas (CA); Ahren Britton, Brandon, FL (US); Ram Prasad Melahalli Sathyanarayana, Vancouver (CA); Rhonda Maria Hyslop, North Vancouver (CA); Donald Robert Clark, Lutz, FL (US)

(73) Assignee: Ostara Nutrient Recovery Technologies Inc., Vancouver (CA)

( * ) Notice: Subject to any disclaimer, the term of this patent is extended or adjusted under 35 U.S.C. 154(b) by 1041 days.

(21) Appl. No.: 14/240,701

(22) PCT Filed: Sep. 21, 2012

(86) PCT No.: PCT/CA2012/050665
§ 371 (c)(1),
(2) Date: Feb. 24, 2014

(87) PCT Pub. No.: WO2013/040716
PCT Pub. Date: Mar. 28, 2013

(65) Prior Publication Data
US 2014/0231359 A1    Aug. 21, 2014

Related U.S. Application Data

(60) Provisional application No. 61/562,388, filed on Nov. 21, 2011, provisional application No. 61/537,496, filed on Sep. 21, 2011.

(51) Int. Cl.
*C02F 9/00* (2023.01)
*C01B 25/32* (2006.01)
(Continued)

(52) U.S. Cl.
CPC ............... *C02F 9/00* (2013.01); *C01B 25/32* (2013.01); *C01B 33/20* (2013.01); *C02F 1/5236* (2013.01);
(Continued)

(58) Field of Classification Search
CPC .. C02F 9/00; C02F 1/5236; C02F 1/58; C02F 1/583; C02F 1/60; C02F 1/66;
(Continued)

(56) References Cited

U.S. PATENT DOCUMENTS 4,171,342 A  10/1979 Hirko et al.
4,320,012 A  3/1982 Palm et al.
(Continued)

OTHER PUBLICATIONS

Britannica, Effluent polishing, Feb. 1, 2001, p. 1/3 (Year: 2001).*
(Continued)

*Primary Examiner* — Bobby Ramdhanie
*Assistant Examiner* — Donovan Bui-Huynh
(74) *Attorney, Agent, or Firm* — Oyen Wiggs Green & Mutala LLP

(57) ABSTRACT

A method for treating phosphate-containing wastewater, such as phosphogypsum pond water. The method includes the steps of: (a) adding a first cation to the wastewater to precipitate fluorosilicate from the wastewater; (b) adding a second cation to the wastewater to precipitate fluoride from the wastewater; (c) raising the pH of the wastewater to precipitate the second cation from the wastewater; (d) removing residual silica from the wastewater; and (e) precipitating phosphate from the wastewater. The precipitated fluorosilicate may be sodium fluorosilicate. The precipitated phosphate may be struvite.

59 Claims, 11 Drawing Sheets

(51) Int. Cl.
*C01B 33/20* (2006.01)
*C02F 1/52* (2023.01)
*C02F 1/58* (2023.01)
*C02F 1/60* (2023.01)
*C02F 1/66* (2023.01)
*C02F 101/10* (2006.01)
*C02F 101/14* (2006.01)

(52) U.S. Cl.
CPC ............ *C02F 1/58* (2013.01); *C02F 1/583* (2013.01); *C02F 1/60* (2013.01); *C02F 2001/5218* (2013.01); *C02F 1/66* (2013.01); *C02F 2101/10* (2013.01); *C02F 2101/14* (2013.01)

(58) Field of Classification Search
CPC ......... C02F 2001/5218; C02F 2101/10; C02F 2101/14; C02F 2101/105; C02F 1/441; C02F 1/5245; C02F 2101/16; C02F 2209/06; C02F 2301/08; C02F 1/001; C02F 1/008; C02F 1/20; C02F 1/283; C02F 1/42; C02F 1/44; C02F 1/52; C02F 1/5254; C02F 1/72; C02F 1/722; C02F 1/76; C02F 1/78; C02F 2103/10; C02F 2209/001; C02F 2209/003; C02F 2209/01; C02F 2209/04; C02F 2209/40; C02F 5/00; C01B 25/32; C01B 33/20; C01B 25/22; C01B 25/235; C01B 25/237; C01B 25/2375; C01B 25/28; C01B 25/322; C01B 25/328; C01B 25/416; C01B 25/45; C01B 25/451; B01D 2311/04; B01D 2311/06; B01D 2311/12; B01D 2311/25; B01D 2311/2623; B01D 2311/2649; B01D 2311/268; B01D 61/022; B01D 61/04; B01D 9/005; A61L 27/16; A61L 27/507; A61L 27/56; Y10S 210/906; Y10S 210/915; Y10S 210/903; C08L 27/18; A23K 20/26; A61F 2/82; B29C 43/222; B29C 43/24; B29C 48/022; B29C 48/08; B29C 55/005; B29K 2027/18; C05B 17/00; Y10T 428/1352; Y10T 428/139; Y10T 428/1393; Y10T 428/24802

See application file for complete search history.

(56) References Cited

U.S. PATENT DOCUMENTS

| | | | |
|---|---|---|---|
| 5,112,499 A | | 5/1992 | Murray et al. |
| 6,113,797 A | * | 9/2000 | Al-Samadi .......... B01D 61/022 210/650 |
| 6,758,976 B2 | | 7/2004 | Michalski et al. |
| 6,758,977 B2 | | 7/2004 | Michalski et al. |
| 7,491,333 B1 | | 2/2009 | Luke et al. |
| 7,560,031 B1 | | 7/2009 | Astley et al. |
| 7,622,047 B2 | | 11/2009 | Koch et al. |
| 2011/0127223 A1 | | 6/2011 | Astley et al. |

OTHER PUBLICATIONS

Sutherland, What is nanofiltration?, Mar. 18, 2009, p. 1-3 (Year: 2009).*

Battistioni, P. et al., "Phosphogypsum Leachate: Treatment Feasibility in a Membrane Plant", Ind. Eng. Chem. Res. 2006, 45, 6504-6511.

Jardine, K. et al., "Phosphate Plant Pond Water Treatment Using Reverse Osmosis", The 17th Annual Regional Phosphate Conference, Oct. 17 and 18, 2002, Lakeland, Florida.

Perpich, B. Jr. et al., "Mobile Wastewater Treatment Helps Remediate Concentrated Acidic Process Water at Fertilizer Plant", Florida Water Resources Journal, Jul. 2005.

Battistioni, P. et al., "Chemical-Physical Pretreatment of Phosphogypsum Leachate", Ind. Eng. Chem. Res. 2006, 45, 3237-3242.

* cited by examiner

TREATMENT OF PHOSPHATE-CONTAINING WASTEWATER WITH FLUOROSILICATE AND PHOSPHATE RECOVERY

CROSS-REFERENCE TO RELATED APPLICATIONS

This application claims priority from U.S. application No. 61/537,496 filed on 21 Sep. 2011 entitled: TREATMENT OF PHOSPHATE-CONTAINING WASTEWATER WITH FLUOROSILICATE AND PHOSPHATE RECOVERY and U.S. application No. 61/562,388 filed on 21 Nov. 2011 entitled: TREATMENT OF PHOSPHATE-CONTAINING WASTEWATER WITH FLUOROSILICATE AND PHOSPHATE RECOVERY. For purposes of the United States, this application claims the benefit under 35 U.S.C. § 119 of U.S. application No. 61/537,496 filed on 21 Sep. 2011 entitled: TREATMENT OF PHOSPHATE-CONTAINING WASTEWATER WITH FLUOROSILICATE AND PHOSPHATE RECOVERY and U.S. application No. 61/562,388 filed on 21 Nov. 2011, which are hereby incorporated herein by reference for all purposes.

TECHNICAL FIELD

The invention relates to treatment of phosphate-containing wastewater, such as phosphogypsum pond water, and the recovery of useful fluorosilicate and phosphate compounds, such as sodium fluorosilicate and struvite from such wastewater.

BACKGROUND

Phosphogypsum pond water is a wastewater byproduct of phosphoric acid production. Phosphogypsum pond water is contaminated with a variety of chemical species including phosphates, fluoride and silica. Phosphogypsum pond water is also highly acidic. Ponds containing large quantities of phosphogypsum pond water present significant risks to the environment.

Processes for treating phosphate-containing wastewater, such as phosphogypsum pond water, that reduce or eliminate contaminants while recovering commercially useful compounds would be desirable.

SUMMARY

This invention has several aspects. One aspect provides methods for treating wastewater containing phosphates. Some embodiments of the methods are particularly advantageous for permitting recovery of materials from the wastewater that have value and are useful in a wide range of industrial and commercial processes. In some embodiments struvite or other materials useful as fertilizers are produced. Some embodiments of the methods are applicable to treating wastewater from phosphogypsum ponds which would otherwise prevent very significant hazards to the environment. Other aspects provide systems for treating wastewater.

Some embodiments of the invention relate to methods for treating phosphate-containing wastewater while recovering commercially useful fluorosilicate compounds and phosphate compounds. The phosphate compounds may, for example, be recovered in the form of struvite. Struvite has application, inter alia, as a fertilizer.

Some embodiments provide processes which sequentially remove species from phosphate-containing wastewater (such as, for example, phosphogypsum pond water) in a sequence such that the removed species are provided in a relatively pure form. The overall process ameliorates the wastewater. Bases may be introduced to increase the pH of phosphate-containing wastewater. Cations may be introduced to 1) remove contaminants, 2) recover fluorosilicate and/or 3) recover phosphate compounds. In some embodiments, cations and/or alkali are recirculated to maximize contaminant removal and recovery of fluorosilicate and phosphate compounds while maintaining a process that has overall improved cost-effectiveness.

Some embodiments of the invention relate to treatment processes wherein the phosphate-containing wastewater is phosphogypsum pond water, the fluorosilicate is recovered in the form of sodium fluorosilicate, and the phosphate compound is recovered in the form of granular struvite (e.g. as struvite pellets). These embodiments coincide with aspects of the invention having significant commercial utility. The scope of the invention, however, is not limited to these embodiments.

One non-limiting example aspect provides a method for treating phosphate-containing wastewater. The method comprises: adding a first cation to the wastewater to precipitate fluorosilicate from the wastewater; adding a second cation to the wastewater to precipitate fluoride from the wastewater; raising the pH of the wastewater to precipitate the second cation from the wastewater; removing residual silica from the wastewater; and precipitating phosphate from the wastewater.

One non-limiting example aspect provides a system for treating phosphate-containing wastewater, for example, from a phosphogypsum pond. The system comprises an input connected to draw in phosphate-containing wastewater from a source of wastewater such as a phosphogypsum pond. A fluorosilicate precipitation stage comprising one or more first vessels is connected to receive the phosphate-containing wastewater from the input. The fluorosilicate precipitation stage comprises a first reagent injection mechanism arranged to deliver a first reagent comprising a first cation to the wastewater in one or more of the one or more first vessels to precipitate fluorosilicate from the wastewater. A fluoride removal stage comprising one or more second vessels is connected to receive liquid effluent from the fluorosilicate precipitation stage. The fluoride removal stage comprises a second reagent injection mechanism arranged to deliver a second reagent comprising a second cation and a base to the wastewater in one or more of the one or more second vessels to precipitate fluoride from the wastewater. A settling tank connected to receive liquid effluent from the fluoride removal stage. A phosphate removal mechanism which, in some embodiments comprises a recirculating crystallizer is connected to receive liquid effluent from the settling tank. The crystallizer may be configured to precipitate a phosphate-containing compound from the wastewater and comprising a mechanism for harvesting particles of the phosphate-containing compound.

Further aspects of the invention and features of non-limiting embodiments of the invention are described below and illustrated in the accompanying drawings.

BRIEF DESCRIPTION OF THE DRAWINGS

The accompanying drawings illustrate non-limiting example embodiments of the invention.

DETAILED DESCRIPTION

Throughout the following description, specific details are set forth in order to provide a more thorough understanding of the invention. However, the invention may be practiced without these particulars. In other instances, well-known elements have not been shown or described in detail to avoid unnecessarily obscuring the invention. Accordingly, the specification and drawings are to be regarded in an illustrative, rather than a restrictive, sense.

Figure 1:
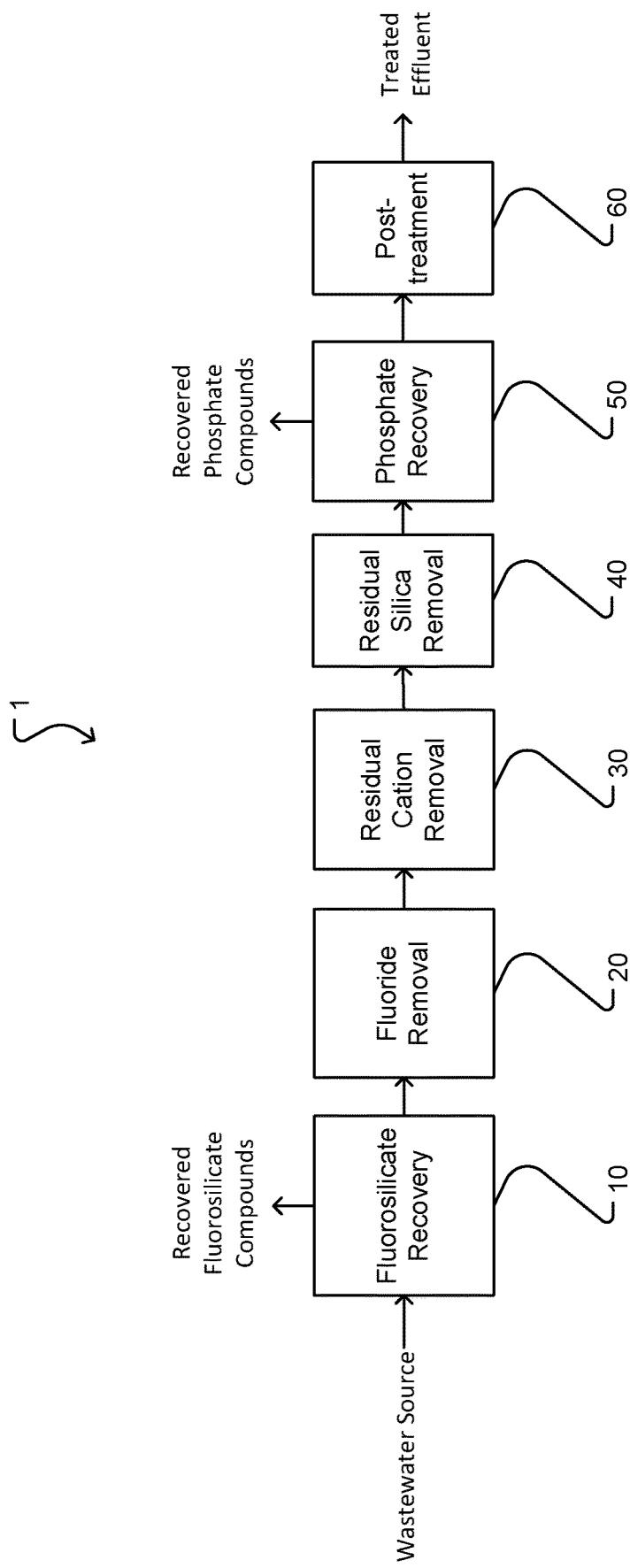
FIG. 1 is a flowchart illustrating a process for treating phosphate-containing wastewater according to one embodiment of the present invention.

FIG. 1 illustrates in a general manner a wastewater treatment process 1 according to one non-limiting example embodiment of the invention. In process 1, phosphate-containing wastewater from a wastewater source undergoes in sequence a fluorosilicate recovery step 10, fluoride removal step 20, residual cation removal step 30, residual silica removal step 40, and a phosphate recovery step 50. The wastewater may then optionally undergo post-treatment step 60 to yield treated effluent ready for discharge or other uses, to recover an alkaline cation solution from the effluent for recycling to steps 10, 20, 30, 40, and/or 50 as a substitute for fresh reagent cation source or alkali material, and/or to recover phosphate fines for recycling to step 50.

In some embodiments, the steps of process 1 are performed in apparatus that receives wastewater (for example, the wastewater may be pumped from a phosphogypsum pond) and processes that wastewater to remove chemical species as described herein. Effluent from the process may be returned to the pond and/or, if sufficiently purified, may be discharged to the environment, and/or returned to a wet process phosphoric acid plant as makeup water for use in cooling water or boilers. The apparatus may comprise suitable tanks, chambers, reactors, or the like for receiving the wastewater, dispensers and/or mixers for adding reagents to the wastewater as described below together with process monitoring and control apparatus for treating the wastewater. In some embodiments, solids generated during the steps of process 1 may be removed. Such solids may be removed by one or more suitable solids separation devices such as a clarifier, settling pond, lamella clarifier, upflow sludge blanket clarifier, disk filter, centrifuge, vacuum filter, dissolved air floatation device or the like. The removed solids may be further dewatered with the use of suitable dewatering apparatus if desired. Solids separation and dewatering may be aided by the use of certain polymers or coagulants to increase the concentration of solids removed in the slurries and reduce the settling/separation time required.

In some embodiments, different steps are performed in different vessels. For example, fluorosilicate recovery step 10 may be performed by receiving wastewater in one or more tanks. After each step the wastewater may be transferred to a subsequent tank for the next processing step. In other embodiments, two or more of the steps may be performed while the wastewater is retained in one vessel. Embodiments may provide batch-processing modes or continuous processing modes.

For example, fluorosilicate recovery step 10 may be performed on a batch of wastewater held in one or more tanks. The wastewater may then be transferred to another tank (or set of tanks) for fluoride removal step 20. In some embodiments, fluoride-containing solids from fluoride removal step 20 are recovered in a clarifier. In some embodiments, more than one clarifier or the like may be used to recover solids from fluoride removal step 20. Residual cation removal step 30 may be done using one or more mixers. The mixers may add one or more bases to raise the pH at residual cation removal step 30. In some embodiments, residual cation removal step 30 is done in one or more tanks. The wastewater may be transferred to an aging tank for residual silica removal step 40. In some embodiments the aging tank has a greater capacity than tanks used for earlier steps in the process. Solids from residual cation removal step 30 and residual silica removal step 40 may be settled together in a settling tank, for example. In other embodiments, solids from residual cation removal step 30 and residual silica removal step 40 may be settled in separate settling tanks after each step.

In some embodiments, where phosphate is recovered as struvite for example, phosphate recovery step 50 is performed using a fluidized bed struvite reactor. One example of such a reactor is the apparatus such as that described by Koch et al. in U.S. Pat. No. 7,622,047, incorporated herein by reference. In some embodiments, the precipitated phosphate-containing compounds formed in the reactor are dewatered and dried in a dryer.

In some embodiments, post-treatment step 60 may include capturing precipitated phosphate fines. Fines may be efficiently captured in a settling or thickening device (for example a clarifier, settling pond, lamella clarifier, gravity thickener, upflow sludge blanket clarifier, belt thickener, disk filter, or other effective solids separation device). Fines may be filtered on a belt filter or other suitable filter, for example. Filtered solids may be dried in a dryer. The filtered solids may be pelletized for use as fertilizer or for some other application. Alternatively the captured fines may be dissolved by addition of a suitable acid. In some embodiments a mineral acid that provides the desired pH change is added to reduce pH to dissolve captured fines. In some embodiments sulphuric acid may be suitable because of its availability at a phosphoric acid production complex and because it does not introduce any undesirable elements such as chloride into the process that could lead to increased corrosivity of the processed water and are not otherwise disposed of in the solids produced. The acidified phosphate fines solution will then contain the dissolved species in the phosphate product and can be re-introduced to phosphate recovery step 50 along with additional alkali (any alkali can be used, but non-calcium containing alkalis are desirable for recovering struvite). Sodium hydroxide has been shown to be particularly effective, while also adding a sodium source that can later be re-used to form sodium fluorosilicate in step 10 through recycling of concentrate from post treatment as discussed below.

In some embodiments, post-treatment step 60 includes liming. Lime sludge from the liming step may be removed in a clarifier, for example. In some embodiments, post-treatment step 60 may include membrane treatment, for example including one or more stages of membranes that may each comprise a reverse osmosis or nanofiltration membrane, for example. In some embodiments, post treatment step 60 may comprise passing the clarified effluent from the fines separation step through a pre-filtration stage (one or more of a cartridge filter, disk filter, granular media filter, ultrafilter, microfilter or the like) to remove residual suspended solids and reduce the silt density index of the solution. This filtered solution can then be passed through a nanofiltration membrane (for example a sulphate selective nanofiltration membrane) to produce a concentrate with a high concentration of sodium and sulphate and a permeate with a much reduced level of sodium, sulphate and other ions. This permeate stream can then be treated with a reverse osmosis membrane to produce a permeate with remaining dissolved ions below applicable limits for discharge to receiving waters or for reuse in industrial processes such as boilers or cooling towers, and a concentrate stream that can be recirculated to one or more of the pre-treatment stages (10, 20, 30, 40) of the treatment process as disclosed below optionally mixed with the nanofiltration concentrate.

In some embodiments the reverse osmosis membrane is operated at relatively low pressure, for example 150-300 psi. Control of pH can be used before the nanofiltration membrane or between the nanofiltration membrane and the reverse osmosis membrane to improve the selectivity for certain ions such as ammonia and/or to reduce membrane fouling potential. In some embodiments control of pH includes reducing pH before one or more membranes. Reducing pH may have one or more of the following effects: (i) shifting the equilibrium of $NH_3 <-> NH_4^+$ toward $NH_4^+$ as many membranes will reject $NH_4^+$ more strongly than $NH_3$, and (ii) reducing saturation of cations in solution (since the solubility of many salts increases as pH decreases) and thereby reducing precipitation of salts which could clog the membrane(s). In some embodiments, pH may be raised for (a) subsequent membrane(s) since some ions are better rejected at higher pH.

The nanofiltration concentrate alone or mixed with the reverse osmosis concentrate, containing high concentrations of sodium and sulphate and lower concentrations of other ions, can then be treated with an alkali, such as lime, to produce a gypsum ($CaSO_4$) precipitate, and a relatively high concentration sodium hydroxide solution with a pH of 10-13. A solids separation step (clarifier, filter, or the like) is then used to separate the solids from the solution. The gypsum precipitate will likely contain some unreacted lime, and this slurry can be used as a substitute for at least some of the fresh lime used in fluoride removal step 20 to precipitate calcium fluoride. The high concentration sodium hydroxide solution with pH of 10-13 can be used as an alkaline sodium source for precipitating sodium fluorosilicate in fluorosilicate recovery step 10, or for pH control in one or more of steps 10, 20, 30, and 40. The post-treatment membrane treatment and alkali treatment (e.g. liming) of the concentrate from the membrane treatment regenerates the sodium hydroxide used in the upstream processes to avoid the need to add new sodium hydroxide to the process. Thus using lime as the primary alkali source for the process reduces or obviates any need to introduce calcium ions to the stages where introduction of calcium would result in increased phosphate precipitation in pretreatment (steps 20, 30, 40), and therefore reduction in yield of recovered phosphate product in step 50.

An alternative arrangement for the nanofiltration followed by reverse osmosis process is to pass the clarified and filtered fines capture effluent directly through a higher pressure reverse osmosis system (operating pressure may be for example 300 to 800 psi) with the same liming process used on the concentrate to produce a gypsum/lime solids fraction and a sodium hydroxide alkali solution.

In some embodiments, one or more of the steps of process 1 may be done in a batch process or as a continuous process. In some embodiments, in the case of treating phosphogypsum pond water, one or more of the steps of process 1 may be done directly in the phosphogypsum pond, or in settling ponds used to retain the formed solid reaction products. In some embodiments, in the case of treating phosphogypsum pond water, effluent from one or more of the steps of process 1 may be circulated back into the phosphogypsum pond.

In some embodiments, the phosphate-containing wastewater may be phosphogypsum pond water. In other embodiments, the phosphate-containing wastewater may be agricultural wastewater, municipal wastewater, wastewater from other industrial processes, or the like.

Fluorosilicate recovery step 10 may be performed by adding a cation source and raising the pH to a level sufficient to precipitate fluoride and silica from the wastewater as a fluorosilicate of the cation. The cation may, for example, be sodium, calcium, or magnesium, to yield sodium fluorosilicate, calcium fluorosilicate, or magnesium fluorosilicate, respectively. Sodium fluorosilicate is a useful material. Sodium fluorosilicate is used, for example, in fluoridation of drinking water and in the manufacture of silicon. In some embodiments two or more different cations may be added at fluorosilicate recovery step 10 to yield different fluorosilicates or different mixtures of fluorosilicates (e.g. a mixture of sodium fluorosilicate and calcium fluorosilicate, or a mixture of sodium fluorosilicate, calcium fluorosilicate and potassium fluorosilicate).

The amount of cation source added may be based on measured concentrations of fluoride and silica in the wastewater. In some embodiments the cation source may be added in a stoichiometric amount to precipitate the fluorosilicate of the cation. In yet other embodiments the cation source may be added in excess to precipitate the fluorosilicate of the cation.

Where fluorosilicate recovery step 10 includes adding a cation source and raising the pH to a predetermined level, in some embodiments a cation base may be added to simultaneously supply the source of cation and raise the pH. In other embodiments a cation source and a base may be added as separate chemicals. The base in such embodiments may be dosed on a stoichiometric ratio with the phosphate in the wastewater to pre-load the base for subsequent precipitation at phosphate recovery step 50. For example, if the phosphate compound to be recovered at phosphate recovery step 50 is or comprises struvite, suitable bases may include magnesium- and/or ammonium-containing bases such as magnesium oxide, magnesium hydroxide, ammonium hydroxide, and anhydrous ammonia. Addition of a magnesium-containing base may also promote precipitation of fluoride as magnesium fluorosilicate.

At the end of fluorosilicate precipitation step 10, solids (e.g. precipitated fluorosilicates) may be recovered, for example by settling. Precipitated fluorosilicates may be removed by other mechanisms such as filtering, centrifuging, etc. Precipitated fluorosilicates may then be collected and dried, with subsequent processing to increase their purity as required for their designated use. In some embodiments, the predetermined pH for fluorosilicate precipitation step 10 may be maintained until solids recovery is complete.

Fluorosilicate precipitation step 10 typically does not remove all fluoride from phosphogypsum pond water. Most or all of the remaining fluoride may be removed in fluoride removal step 20.

Fluoride removal step 20 in some embodiments includes adding a cation source and raising the pH in two stages to precipitate remaining fluoride in the wastewater. The cation may, for example, be calcium, magnesium, sodium, or a mix of these, and the precipitated fluoride may be calcium fluoride (fluorite), magnesium fluoride (sellaite), sodium fluoride, or a mix of these. If the cation is added dry, the cation is mixed in the wastewater for a time sufficient to dissolve the cation. The pH is initially raised to, and maintained at, a level high enough for substantial precipitation of the fluoride of the added cation but low enough to prevent any significant precipitation of phosphates of the added cation. For example, where the cation used in fluoride removal step 20 comprises calcium ions the pH may be about 3.5-4.0. The pH may be raised before, during or after the addition of the cation. The cation may be introduced by introducing a cation base, such as lime or limestone, in which case separate addition of a base to initially raise the pH may not be necessary. After the initial fluoride precipitation stage of fluoride removal step 20, the pH is subsequently raised to, and maintained at, a level of lowest solubility for the fluoride of the added cation.

At the initial and/or the subsequent fluoride precipitation stages of fluoride removal step 20, a base free of the added cation may be added to simultaneously raise the pH as required and dose the wastewater on a stoichiometric ratio with the phosphate to pre-load the base for subsequent precipitation at phosphate recovery step 50. For example, if the phosphate compound to be recovered is or comprises struvite, and the added cation is calcium, suitable calcium-free bases may include magnesium- and/or ammonium-containing bases such as magnesium oxide, magnesium hydroxide, ammonium hydroxide, and anhydrous ammonia. Addition of a magnesium-containing base may also assist in removal of fluoride by promoting precipitation of fluoride as magnesium fluoride (sellaite). In this example, a mixture of two or more calcium-free bases may be used to raise the pH at fluoride removal step 20.

Bases may be added in a sequence that accounts for pH-dependent differences in solubility of the bases. For example, the base with better dissolution at a lower pH may be added before the base with lower dissolution at the lower pH. For example, if magnesium oxide and ammonium hydroxide are used as bases, then magnesium oxide may be added first (because its dissolution is better at lower pH), and then ammonium hydroxide added next to reach the pH desired for fluoride removal.

Fluoride removal step 20 may alternatively include adding sufficient cation into the wastewater at a rate such that the product of the cation concentration, the concentration of a fluorine-containing ionic species and the concentrations of any other components of the cation salt exceeds the $k_{sp}$ for the cation salt without being so high as to cause significant precipitation of the phosphate of the cation in the form of relatively insoluble phosphate compounds.

At the end of fluoride removal step 20, precipitated solids (e.g. fluorides of the added cation) may be removed, for example by settling, filtering, centrifuging or the like. The precipitated solids may be settled in the form of sludge, which may be transferred to a sludge pond. Supernatant from the sludge pond may be combined with the supernatant from the settling step before residual cation removal step 30. In some embodiments, fluoride precipitation step 20 may be absent (for example where not much fluoride remains after fluorosilicate precipitation step 20).

Residual cation removal step 30 includes raising the pH to remove residual amounts of the cation added at fluoride removal step 20 but not yet removed. In some embodiments the pH is raised with a non-precipitating base and/or a precipitating base dosed on a stoichiometric ratio with the remaining phosphate to pre-load the precipitating base for phosphate recovery step 50. The non-precipitating base may, for example, be sodium hydroxide. The precipitating base may, for example, be anhydrous ammonia or ammonium hydroxide when the phosphate to be precipitated in phosphate recovery step 50 is struvite.

At the end of residual cation removal step 30, precipitated solids may be removed, for example by settling (or another suitable process). The precipitated solids may be settled in the form of sludge, which may be transferred to a sludge pond. Supernatant from the sludge pond may be combined with the supernatant from the settling step before residual silica removal step 40. In some embodiments, precipitated solids from residual cation removal step 30 may be settled and removed together with solids from residual silica removal step 40. In some embodiments, residual cation precipitation step 30 may be absent.

Residual silica removal step 40 may comprise aging the wastewater for silica gel formation. After aging, the wastewater is mixed to break the gel structure of the silica polymers, and then settled. In some embodiments a suitable flocculant may be added to further promote gelling and settling of the silica polymers. In some embodiments mixing times may be extended sufficiently to allow the silica polymers to settle into dense beds.

At the end of residual silica removal step 40, settled solids are removed. In some embodiments, residual silica removal step 40 may be absent. Since silica gel formation tends to occur at high silica concentrations, embodiments of the invention for processing wastewater with low silica concentrations may result in mostly complete silica removal at fluorosilicate precipitation step 10 and not require residual silica removal step 40.

Phosphate recovery step 50 includes precipitating the phosphate in the wastewater, for example according to the methods and apparatus as described by Koch et al. in U.S. Pat. No. 7,622,047. The phosphate may be recovered in a commercially useful form such as struvite, struvite analogs, or other phosphate compounds. In some embodiments where the desired phosphate to be recovered is struvite or a struvite analog, supersaturation conditions for the phosphate compound may be maintained during phosphate recovery step 50. Maintaining supersaturation conditions may for example include: maintaining a suitable supersaturation ratio; maintaining a suitable pH; maintaining phosphate concentration higher than concentrations of other components of the phosphate compound; and/or controllably introducing compounds comprising at least one of the other components of the desired phosphate compound.

Post-treatment step 60 may include recovering fine particulates of the commercially useful forms of precipitated phosphate. Post-treatment step 60 may additionally or alternatively include one or more polishing steps, the extent and nature of which may depend on the use or discharge point of the treated effluent. For example, polishing steps may reduce residual phosphate, ammonia, metals, conductivity or other parameters. In some embodiments, material recovered from one or more polishing steps may be recirculated to one or more of the pre-treatment steps described above. For example, cations may be recovered in one or more polishing steps and recirculated to fluorosilicate precipitation step 10 and/or fluoride precipitation step 20 as a source of cations and/or alkalinity. In some embodiments, post-treatment step 60 may be absent.

Figure 2:
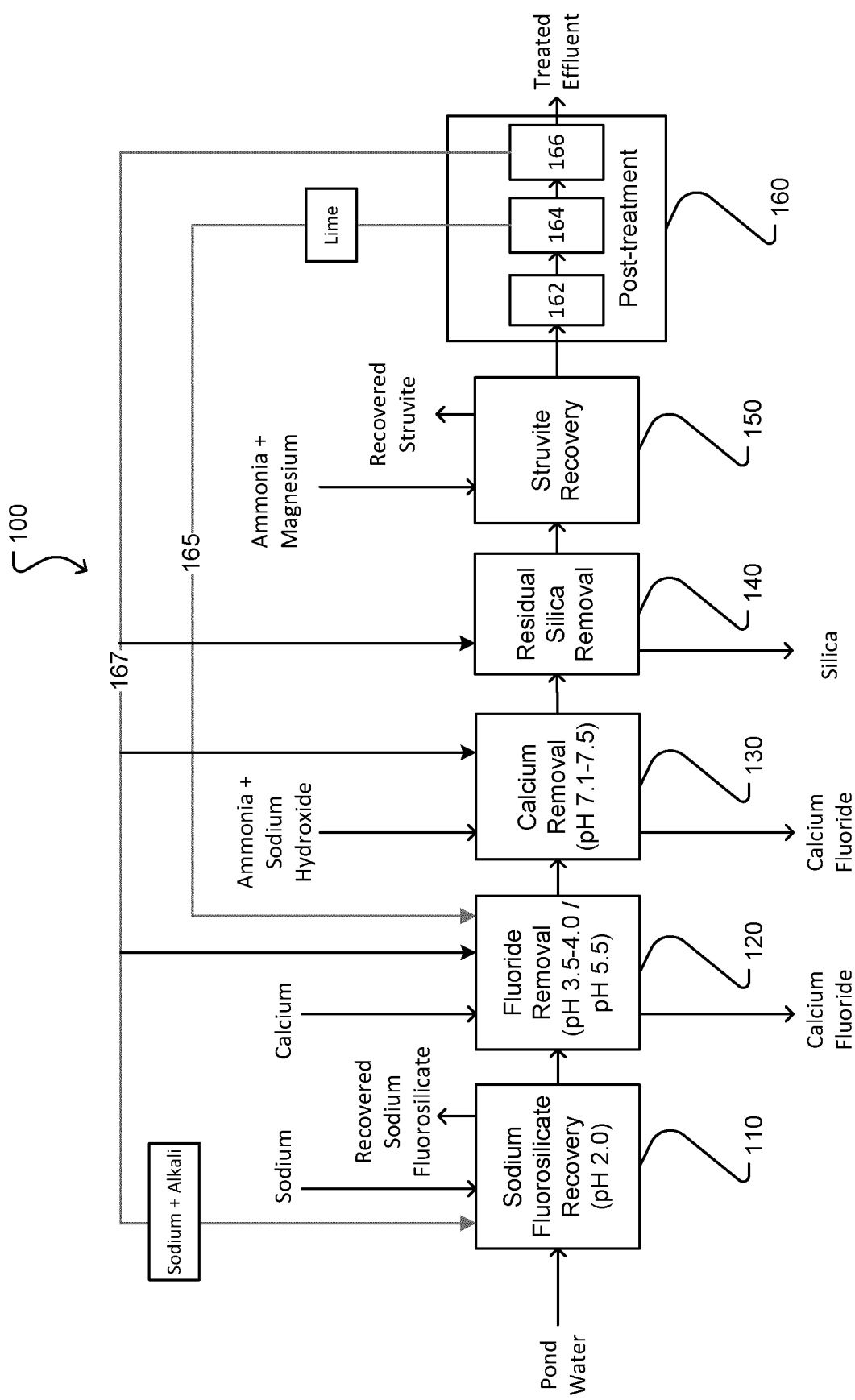
FIG. 2 is a flowchart illustrating a process for treating phosphogypsum pond water according to one embodiment of the present invention.
Figure 8:
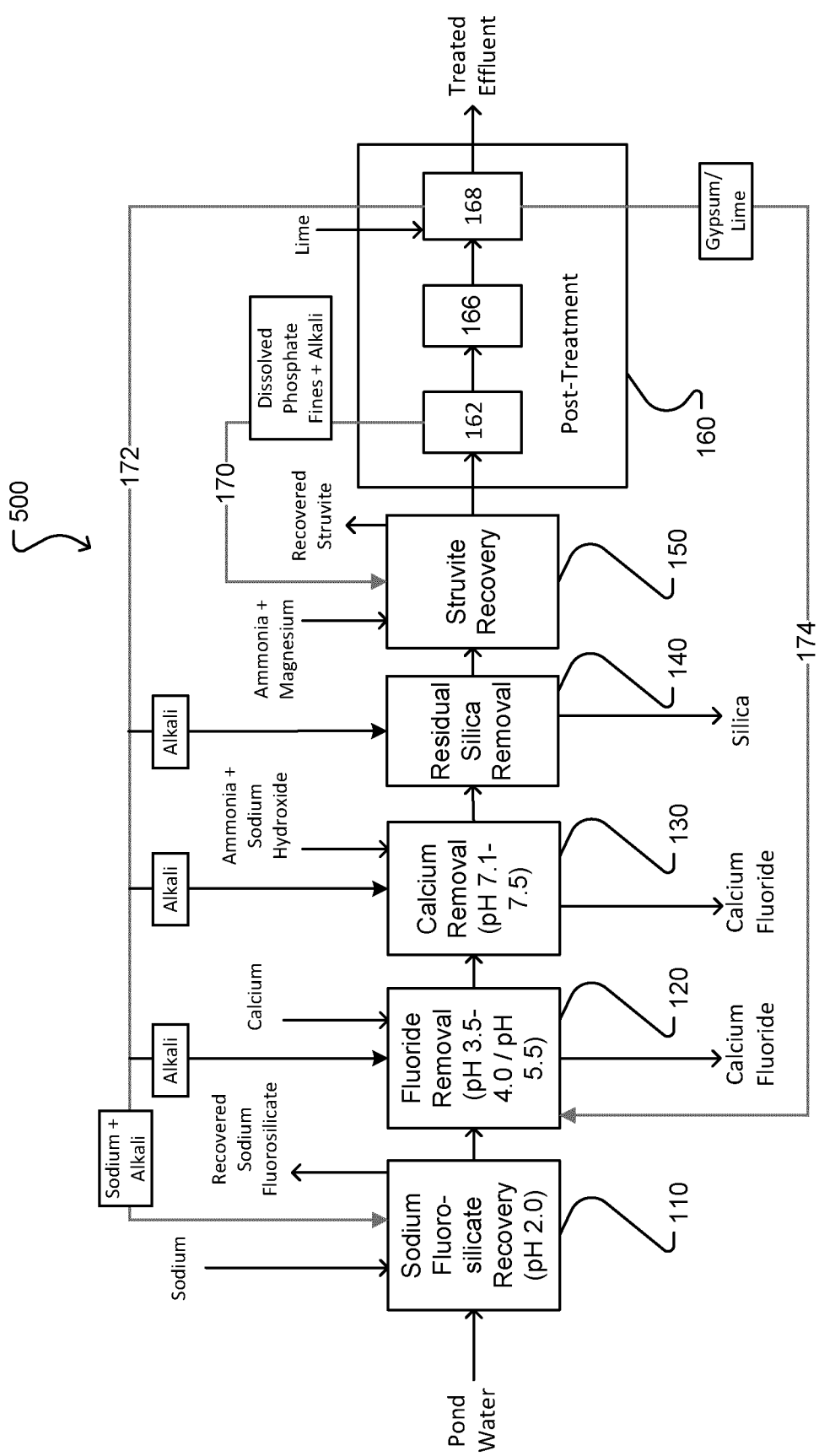
FIG. 8 is a flowchart illustrating a process for treating phosphogypsum pond water according to another embodiment of the present invention.

FIG. 2 illustrates process 100, and FIG. 8 illustrates process 500. Both process 100 and process 500 are embodiments of the invention according to process 1, but more specifically exemplifying treatment of phosphogypsum pond water and recovery of sodium fluorosilicate and struvite. The pH of phosphogypsum pond water is typically 1.2 to 1.7, pH of pond water in some cases is in the range of 1.3 to 1.4.

Sodium fluorosilicate recovery step 110 includes raising the pH of the wastewater to about pH 2.0 with a sodium source. Mixing in the sodium source causes fluoride and silica to precipitate as sodium fluorosilicate. The sodium source may, for example, be a sodium-containing base such as sodium hydroxide, sodium carbonate or sodium bicarbonate, or other sodium source such as sodium chloride, or recovered sodium hydroxide solution produced by liming post treatment membrane concentrate. Precipitated sodium fluorosilicate may be recovered, for example by settling. Recovered sodium fluorosilicate may be filtered and then dried to a powder form. Precipitated sodium fluorosilicate should be removed before moving on to the next step as residual solids can re-dissolve and raise the final fluoride and silica concentrations in downstream processes. Sodium fluorosilicate recovery step 110 may reduce the fluoride concentration of the wastewater to about 4000-5000 mg/L for example, and may reduce the silica concentration to about 500-600 mg/L for example.

Fluoride removal step 120 includes dosing with calcium. The calcium dose may be based on a residual calcium concentration (i.e. the calcium concentration of the wastewater entering fluoride removal step 120 may be measured and the dosing with calcium may be controlled to add the amount of additional calcium necessary to achieve a desired calcium concentration). A calcium concentration of approximately 0.08 to 0.16 mol/L in excess of stoichiometric demand to form $CaF_2$ has been shown by the inventors to remove fluoride to 50-150 mg/L, with or without fluorosilicate precipitation step 110.

Calcium may be added as lime or limestone, for example, and mixed for a time sufficient to dissolve the calcium, for example 1 hour for dry lime. Slurries may require a shorter dissolution time as they are already fully wetted. Calcium may be provided to step 110 as a solution.

The pH is initially raised to about 3.5-4.0, for example, and maintained for at least 2 hours for optimum fluoride removal. Other embodiments may involve longer mix times. The pH at this stage is preferably not raised above about 4.0 since calcium phosphate starts precipitating at pH at or above about pH 4.0. In such embodiments the fluoride precipitation at this stage may be run "fast" since calcium phosphate precipitates slowly.

The initial fluoride removal stage of fluoride removal step 120 removes a substantial amount of the fluoride without interference from the phosphate. The pH is then raised to a level of lowest calcium fluoride solubility; the target pH may be about 5.5, for example. Achieving the target pH will further reduce the fluoride levels. The target pH may be maintained, for example, for about 20-30 minutes. This reduces the fluoride concentration to about 50-150 mg/L for example, and leaves about 600 mg/L for example of calcium in solution.

The solids from fluoride precipitation step 120 are then removed, for example by settling. Again, residual solids can re-dissolve in downstream processes, so separation should be as complete as practicable.

Calcium removal step 130 involves removing calcium to below interference levels for the struvite production at phosphate precipitation step 150. Calcium removal step 130 may involve raising the pH to above 7.0. For example, the pH range for this step may be about 7.0-7.5. The pH may be raised with any non-precipitating base, or calcium deficient base, for example a combination of ammonia gas or ammonium hydroxide liquid with sodium hydroxide. The ammonia may be dosed on a stoichiometric ratio with the remaining phosphate to pre-load ammonia for struvite production at phosphate recovery step 150. Sodium hydroxide may then be added as needed to reach the pH target. As calcium removal also removes phosphate, a molar ratio of 0.7-0.9:1 may be used to minimize excess ammonia addition which may carry over through phosphate recovery step 150. Approximately 10-20% of the phosphate may be lost based on the residual calcium concentration. Fluoride concentration may rise slightly due to re-dissolution of any residual solids after separation. Silica is typically under 100 mg/L for example after calcium removal step 130.

Solids may optionally be removed, for example by settling, after calcium removal step 130. The removed solids may comprise useful materials. For example, the solids may comprise calcium phosphate or compounds containing phosphate and calcium. Such materials may have application, for example, as fertilizers or fertilizer components or as replacements for phosphate are in the production of phosphoric acid.

Residual silica removal step 140 involves aging the wastewater to allow silica gel formation. For example, the wastewater may be allowed to age for 8 to 12 hours or longer. After aging, or while aging, the solution is mixed vigorously to break the gel structure of the silica polymers and allow them to settle. Longer mixing times allow the silica to settle into a denser bed. The settled solids are removed and the remaining pre-treated solution now may have low levels of silica, fluoride, and calcium, and 5000-8000 mg/L phosphorus, for example and a matching stoichiometric amount of ammonia. The solution can now be used for struvite recovery.

Struvite recovery step 150 involves introducing the wastewater to a struvite recovery system. For example, a struvite forming reactor may be used. The reactor may comprise a recirculating fluidized bed reactor for example. Supersaturation conditions for the phosphate compound may be maintained to recover struvite. Maintaining supersaturation conditions may for example include: maintaining a supersaturation ratio of 2 to 5; maintaining a suitable pH; maintaining a phosphate concentration higher than concentrations of ammonia and magnesium; and/or controllably introducing ammonia and magnesium. Ammonia may be added for example as ammonia hydroxide solution or as anhydrous ammonia, magnesium may be added as magnesium chloride, magnesium hydroxide or preferably as magnesium sulphate. Addition of magnesium chloride in a phosphogypsum application may lead to buildup of chloride ions in the system, leading to increased risk of corrosion, while addition of magnesium hydroxide has been found to react incompletely at the operating pH for the struvite recovery step, requiring additional reagent, and also acting as nucleation sites for struvite crystals, resulting in difficulty in producing larger struvite pellets (i.e. 0.5-5 mm diameter). Magnesium sulphate solution can be made on site by reaction of stoichiometric amounts of sulphuric acid with magnesium oxide or magnesium hydroxide with appropriate engineering controls to control reaction temperature. In some embodiments the struvite recovery reactor can be controlled in order to produce struvite granules with a size range of 0.5 to 5 mm in diameter, and sufficient mechanical strength to withstand downstream processing such as classifying, blending with other fertilizer components, transport, and spreading.

Figure 3:
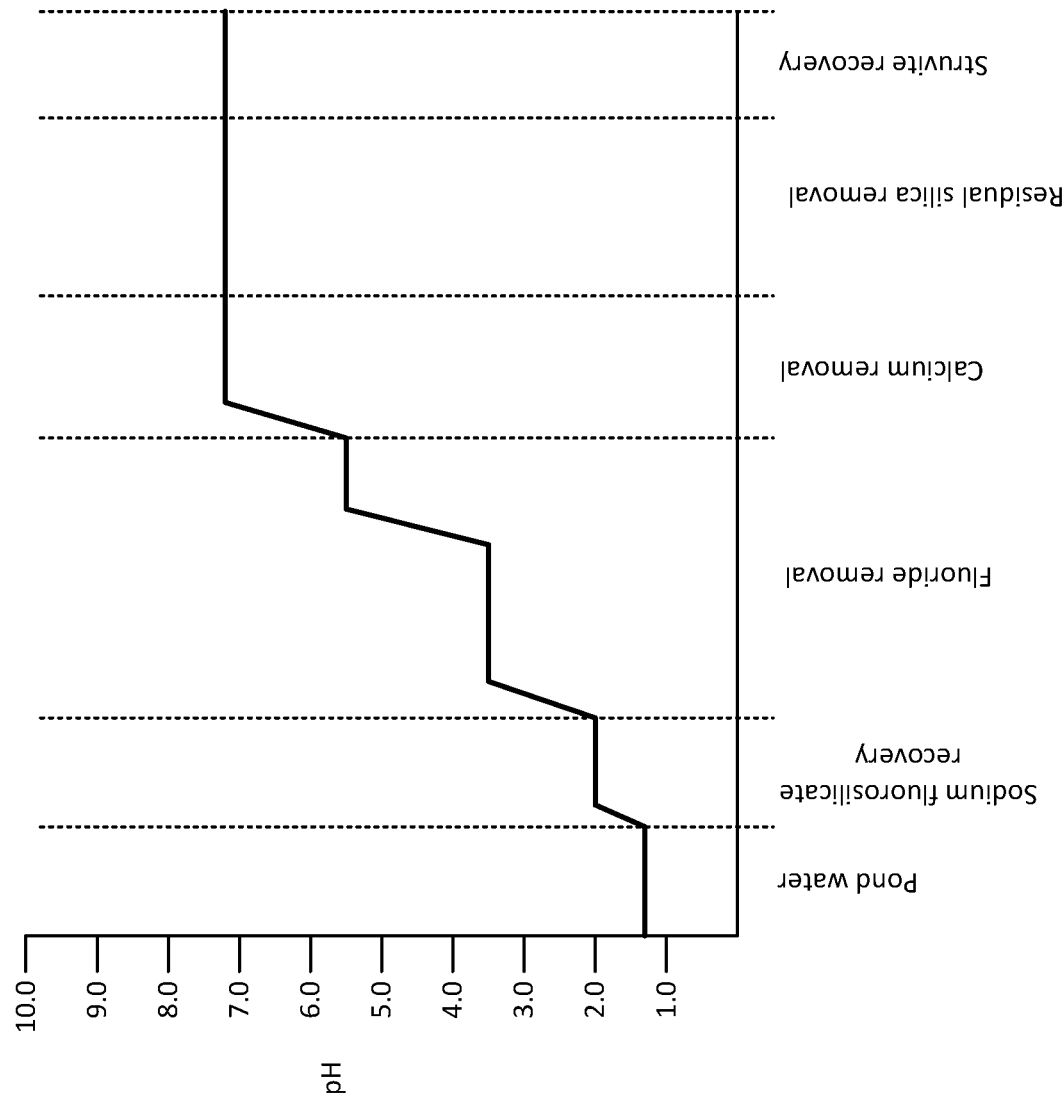
FIG. 3 is a graph illustrating an example of the changes in pH during treating phosphogypsum pond water according to the process illustrated in FIG. 2.

FIG. 3 shows an example of the changes in pH over the course of process 100 from raw phosphogypsum pond water to struvite recovery step 150. In some example embodiments the pH may vary by up to ±0.1 from the pH levels shown in FIG. 3. In other example embodiments the pH may vary by up to ±0.25 from the pH levels shown in FIG. 3. In other example embodiments the pH may vary by up to ±0.50 from the pH levels shown in FIG. 3. In other example embodiments the pH may vary by more than 0.50 from the pH levels shown in FIG. 3.

Figure 4:
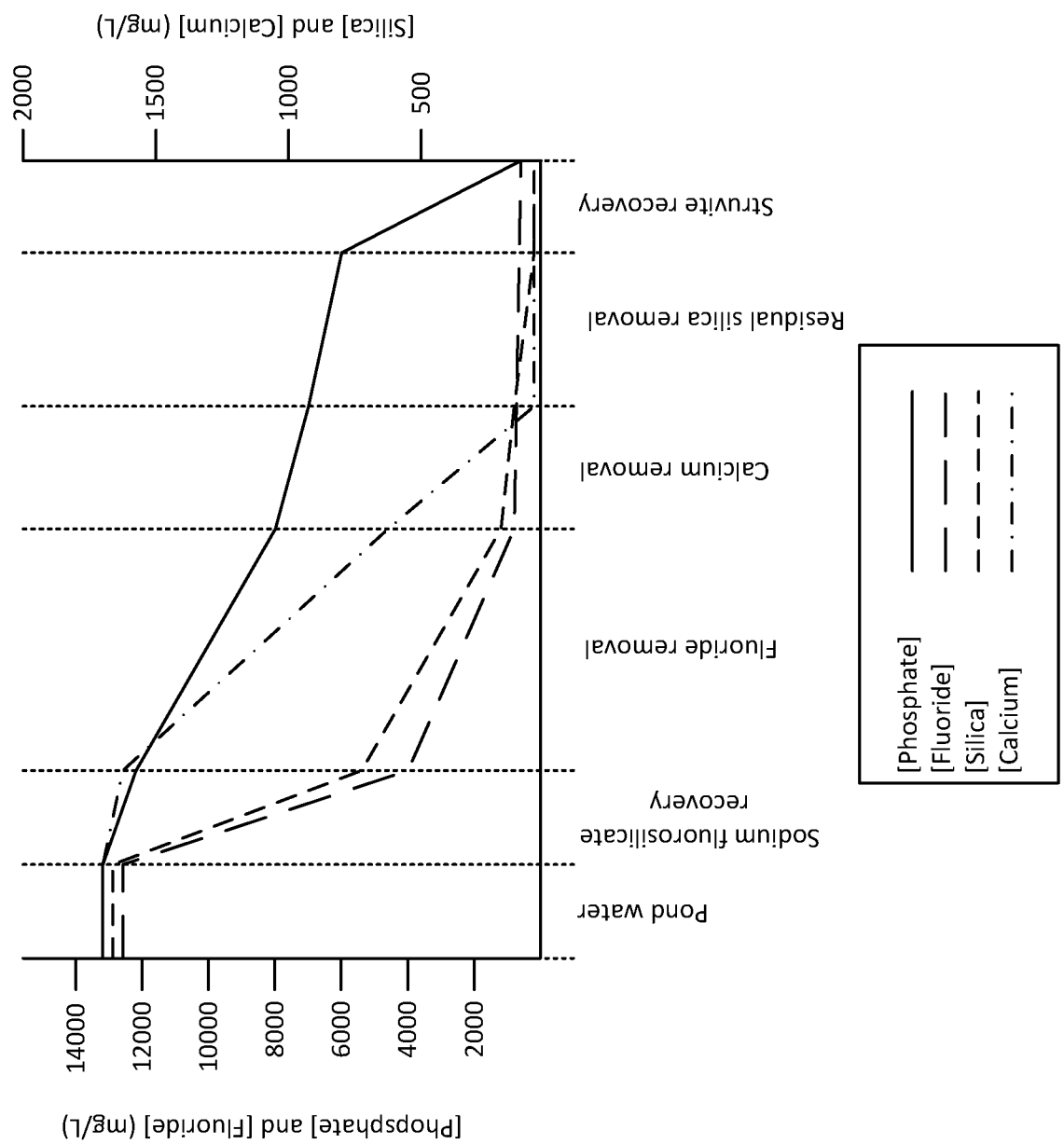
FIG. 4 is a graph illustrating an example of the changes in concentrations of chemical species during treating phosphogypsum pond water according to the process illustrated in FIG. 2.

FIG. 4 shows an example of the changes in the concentrations of phosphate, fluoride, silica and calcium over the course of process 100 from raw phosphogypsum pond water to struvite recovery step 150. In some example embodiments the concentrations of the chemical species may vary by up to ±10% from the levels shown in FIG. 4. In other example embodiments the concentrations of the chemical species may vary by up to ±20% from the levels shown in FIG. 4. In other example embodiments the concentrations of the chemical species may vary by more than 20% from the levels shown in FIG. 4.

Post-treatment steps 160 may include, for example, a fines recovery step 162 where fine particulate struvite particles washed out of the struvite forming reactor are recovered. These recovered fines may then be redissolved by reducing the pH of the fines slurry to approximately 5-6 or such pH as is sufficiently low to dissolve the struvite present, using a mineral acid such as sulphuric acid. As shown in FIG. 8, the dissolved struvite fines solution can then be reintroduced via recirculation step 170 into the struvite formation reactor for further reaction to form new struvite pellets with addition of a base to neutralize the mineral acid which was used to dissolve the fines. This effectively acts as a "fines destruct loop" where fine particles formed in the struvite formation step are dissolved and re-introduced to the reactor where they are allowed to grow into the desired pellet product.

Post-treatment steps 160 may optionally involve further steps, for example depending on the use or discharge point that the treated pond water is to be used for, that reduce residual phosphate, ammonia, metals, conductivity or other parameters. As shown in FIG. 2, this may involve a liming step 164 involving adding sufficient lime to bring the pH of the effluent from fines recovery step 162 to the range of 9.0 to 11.0 depending on the treatment objectives. Lime sludge from liming step 164 could be returned via recirculation step 165 to fluoride removal step 120 as a source of calcium for fluoride removal and as a means to re-solubilize any phosphate precipitated during fluoride removal step 120 for recovery in the struvite recovery step 150. For more stringent discharge limits additional post-treatment such prefiltration followed by a nanofiltration and/or a reverse osmosis step 166 may be provided. As shown in FIG. 2 in some embodiments concentrated reject water can beneficially be returned via recirculation step 167 to sodium fluorosilicate recovery step 110 as a source of recovered sodium ions and alkalinity, and/or one or more of steps 120, 130 or 140 as a source of alkalinity. In this way any excess sodium added in prior steps can be reused as a substitute for fresh sodium added in the sodium fluorosilicate recovery step 110, and to reduce the potential for sodium ion buildup in the system when reverse osmosis is necessary. As shown in FIG. 8, in other embodiments the concentrated reject streams from nanofiltration and/or reverse osmosis step 166 can be treated with an alkali such as lime at alkali treatment step 168 to precipitate and settle the sulphate present in the concentrate as gypsum and yield a relatively high strength solution of sodium hydroxide. Precipitation and separation of the gypsum/lime solids can be performed in a suitable settling/filtration device.

Alkali treatment step 168 provides both a sink for the sulphate added to the system as sulphuric acid and/or magnesium sulphate, and a relatively high strength alkali sodium solution which can be returned via recirculation step 172 to be used as both a sodium source for step 110 and a pH control reagent in one or more of steps 110 thru 140. The residual calcium concentration in this recirculation stream will make it less desirable as an alkali source for pH control in steps 140 and 150 where elevated calcium concentrations will result in loss of phosphate as calcium phosphate compounds. For this reason in some embodiments fresh sodium hydroxide solution is added to steps 140 and 150 as needed for pH control, while recirculating the concentrate stream to step 110 as source of sodium for sodium fluorosilicate production and to one or more of steps 110, 120 and 130 for pH control. Where the gypsum/lime solids are separated from the sodium alkali solution, these solids can be returned via recirculation step 174 to calcium fluoride removal step 120 where unreacted lime in the solids can be used for pH adjustment and as a calcium source while the gypsum remains in solution and any calcium phosphate compounds may be allowed to re-dissolve for recovery in phosphate recovery step 150. In other embodiments, the concentrated reject water may be returned to the phosphogypsum pond.

In some embodiments, for one or more precipitation steps where the precipitate is not important (e.g. where the precipitate is not desired to be recovered or recirculated), the reagents may be mixed in one or more tanks and then directed to one or more ponds for precipitation. For example, the precipitation steps involved may be one or more of fluoride removal step 120, residual calcium removal step 130 and residual silica removal step 140. Supernatant can be drawn off from the pond for processing in the subsequent step, and the settled sludge can be left as a layer at the bottom of the pond, or optionally removed for further processing or disposal. This process can be repeated so that layers of settled sludge build up at the bottom of the pond before optionally being removed for further processing or disposal.

The example treatment process 100, 500 as depicted in FIGS. 2 and 8 have various features that are advantageous. These include for example:

Recovering two commercially valuable product streams, i.e., fluorosilicates (e.g. sodium fluorosilicate) and phosphates (e.g. struvite) from wastewater while simultaneously treating the wastewater by reducing its fluoride, silica, ammonia, sulphate and phosphate concentrations;

Raising the pH at each of the sodium fluorosilicate recovery step, fluoride removal step, and calcium removal step facilitates the reactions at each step and also, at the end of these three steps, provides wastewater at a pH range suitable for struvite recovery;

Reducing or eliminating silica in the wastewater since silica gels can interfere with reactions, solids separation, and proper operation of apparatus used in wastewater treatment;

Where post-treatment includes a liming step, recycling lime sludge as a source of calcium for fluoride removal to reduce the need to add fresh calcium, and as a means to re-solubilize any phosphate precipitated during fluoride removal for recovery during struvite recovery;

Where post-treatment includes nanofiltration and/or reverse osmosis, recycling sodium-containing concentrate to the sodium fluorosilicate recovery step as a source of sodium ions and alkalinity, and to the fluoride and calcium removing steps as a source of alkalinity, significantly reducing the need to add fresh sodium and base; and Where post treatment includes nanofiltration and/or reverse osmosis with liming of the concentrate to precipitate gypsum, the system provides both a sink for sulphate present in the pond water and that added in process reagents, while allowing the principal alkalinity source to be drawn from lime rather than sodium hydroxide, thus significantly reducing the cost of chemicals to operate the process.

Figure 5A:
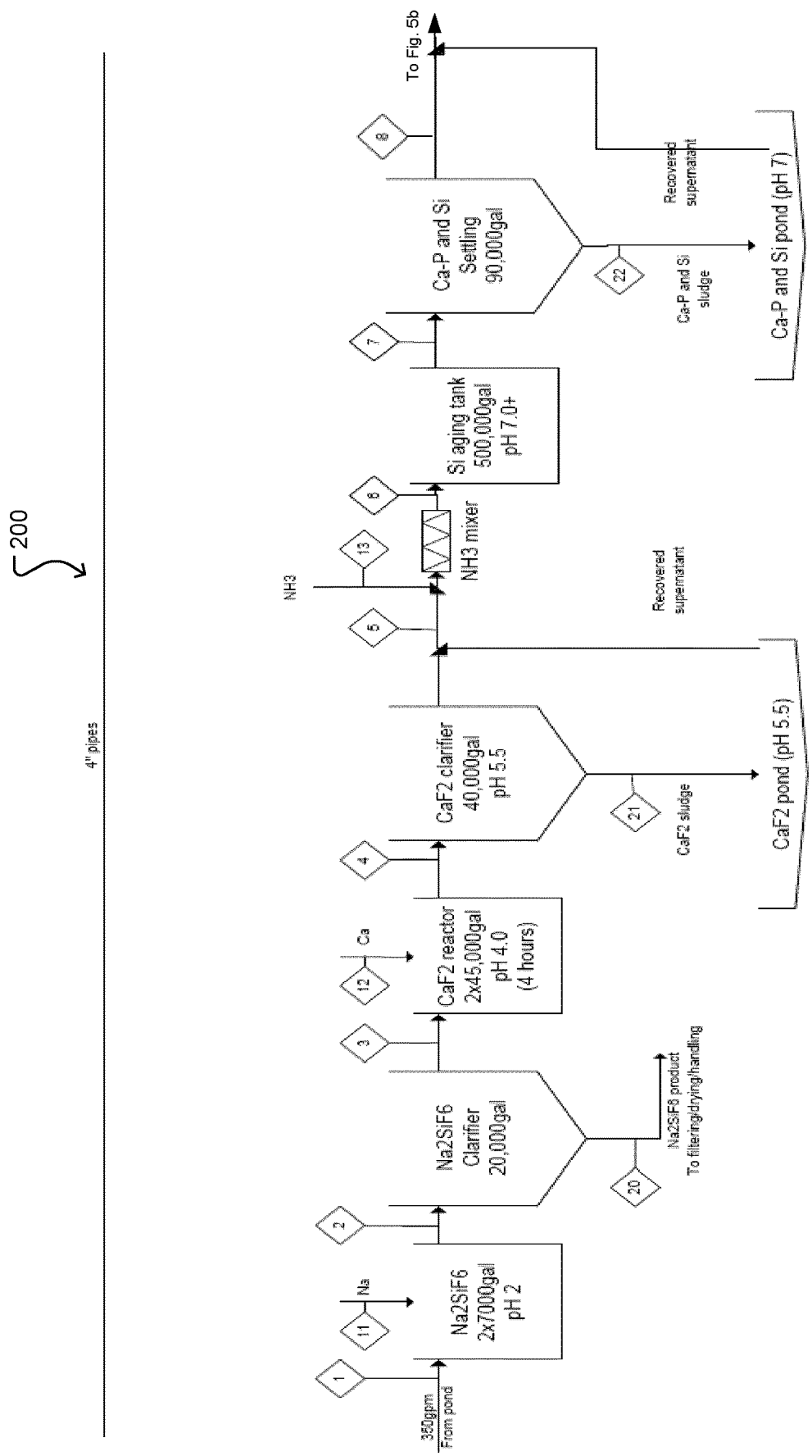
FIGS. 5a and 5b together are a block diagram illustrating a process for treating phosphogypsum pond water according to another embodiment of the present invention.
Figure 5B:
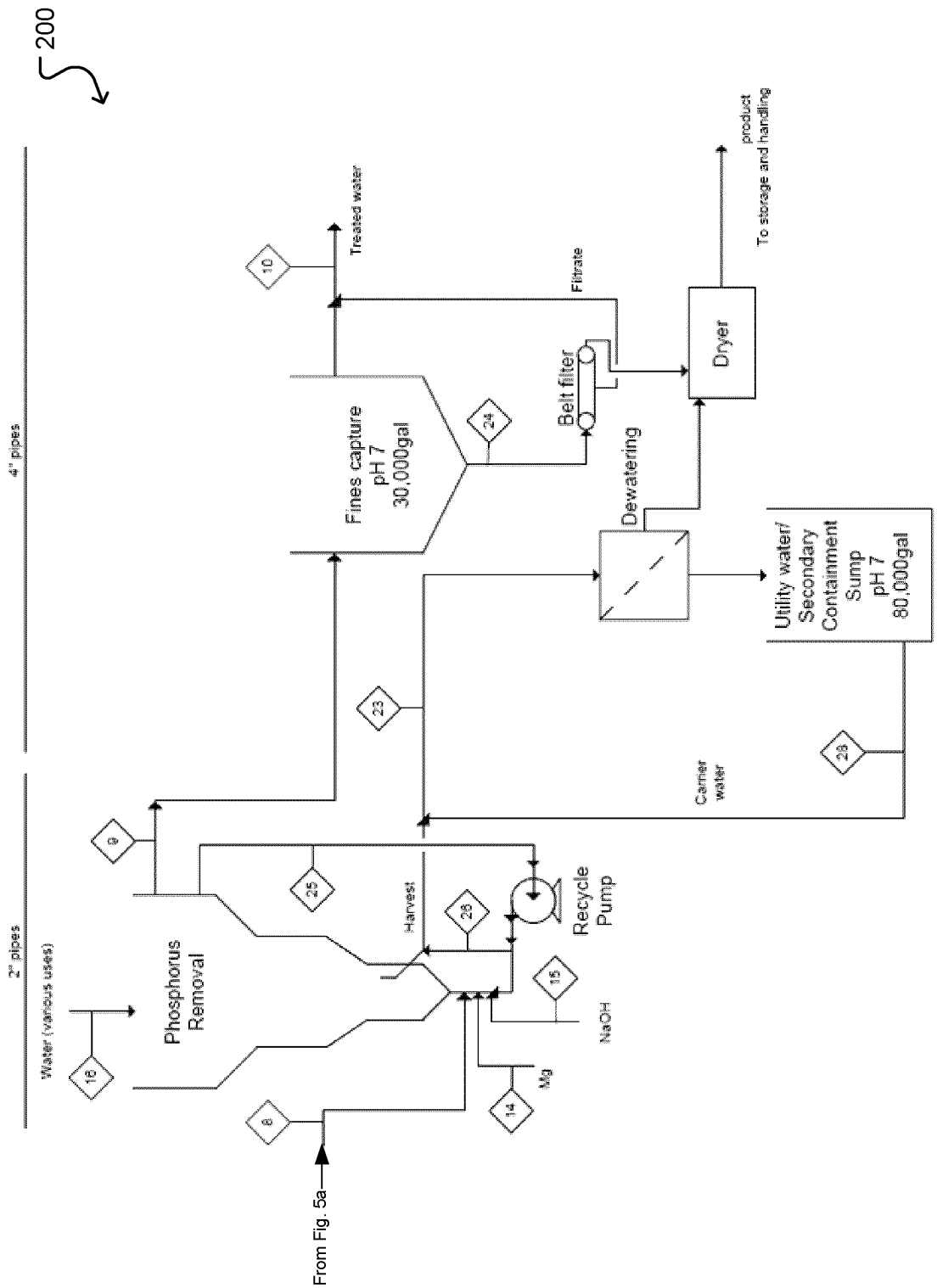

FIGS. 5a and 5b illustrate process 200, another example embodiment of the invention according to process 1, where post-treatment includes a precipitated phosphate fines recovery step.

Figure 6A:
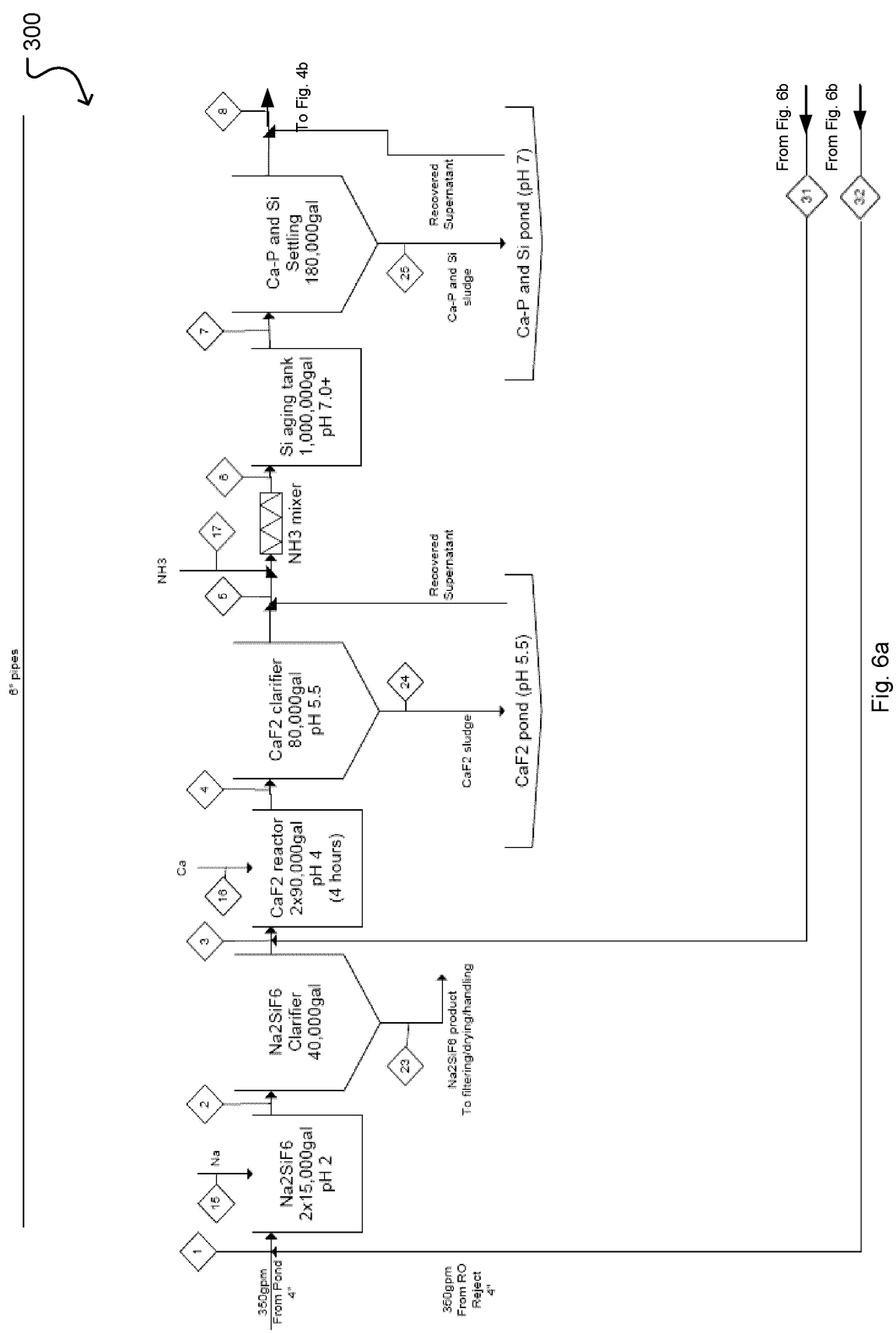
FIGS. 6a and 6b together are a block diagram illustrating a process for treating phosphogypsum pond water according to another embodiment of the present invention.
Figure 6B:
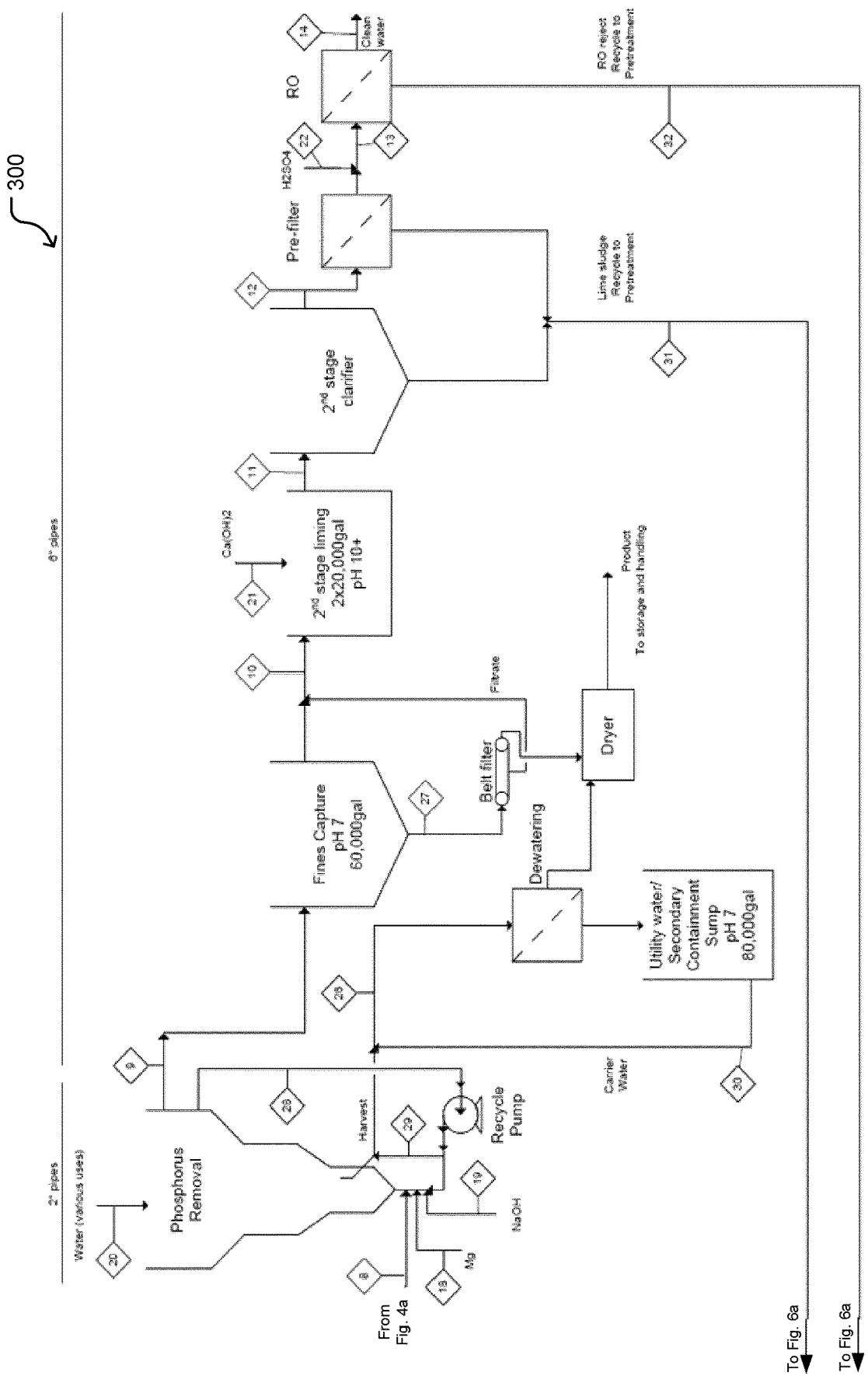
Figure 7A:
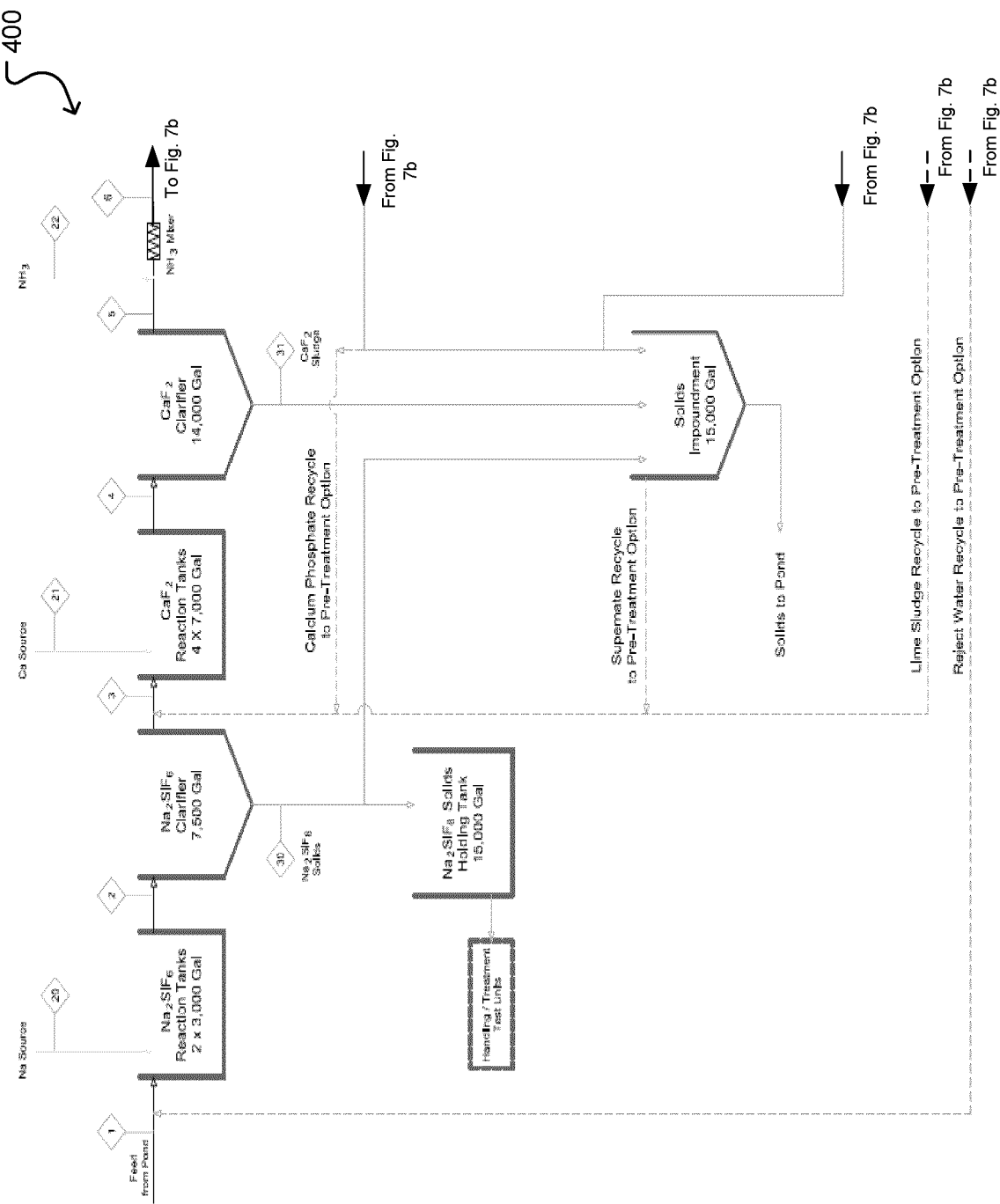
FIGS. 7a and 7b together are a block diagram illustrating a process for treating phosphogypsum pond water according to another embodiment of the present invention.
Figure 7B:
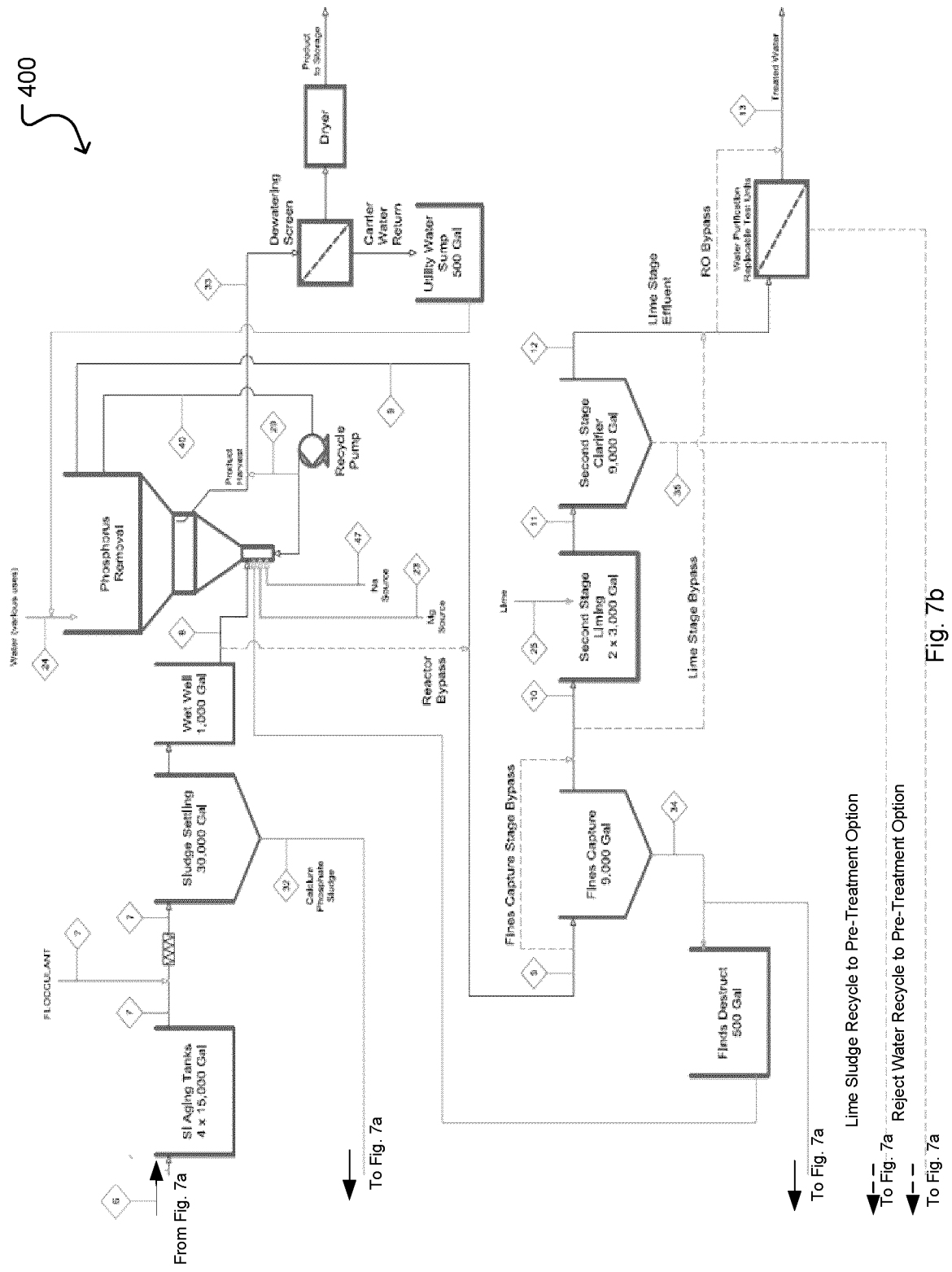

FIGS. 6a and 6b illustrate process 300, another example embodiment of the invention according to process 1, where post-treatment includes a precipitated phosphate fines recovery step, a liming step, and two stage membrane filtration (pre-filtering stage and reverse osmosis stage). FIGS. 7a and 7b illustrate a process 400 similar to process 300 but including a fines destruction loop.

Processes according to any of the embodiments as described herein may include one or more steps in which precipitated or unreacted solids are separated from a fluid. A flocculant, for example, a suitable polymer may optionally be added during or prior to the step in which the precipitated or unreacted solids are settled or otherwise separated. For example, suitable flocculants may be added to speed up and/or increase the efficiency of any one or more of settling or removing: sodium fluorosilicate; calcium fluoride, silica; precipitated phosphate; precipitated gypsum; and unreacted lime.

The following are examples of jar and pilot scale testing of embodiments of the invention up to but not including the phosphate recovery step.

TABLE 1

|      | $PO_4$—P (mg/L) | Si (mg/L) | F (mg/L) | Ca (mg/L) |
|------|---------|-----------|----------|-----------|
| Raw  | 13000   | 1600      | 13400    | 1740      |
| pH 2 | 12100   | 560       | 3900     | 1750      |
| pH 5.5 | 8530  | 84        | 128      | 742       |
| pH 7.1 | 7350  | 47        | 165      | 39        |

The above Table 1 shows results of jar test pretreatment of phosphogypsum pond water, showing the concentrations of the three compounds to be removed prior to the phosphate precipitation/recovery step, as well as the concentration of phosphate, of which as much as possible should be left in solution immediately prior to the phosphate precipitation/recovery step.

Table 2 below shows a second jar test pre-treatment with a phosphogypsum pond water from another source:

TABLE 2

|  | pH | Si (mg/L) | NH3—N (mg/L) | $PO_4$—P (mg/L) | Mg (mg/L) | Ca (mg/L) | F (mg/L) |
|---|---|---|---|---|---|---|---|
| Raw pond water | 1.52 | 1695 | 1125 | 10200 | 162 | 1655 | 8350 |
| 1st stage effluent | 1.99 | 1075 | 1105 | 10400 | 202 | 1595 | 4660 |
| 2nd stage effluent | 5.45 | 425 | 1095 | 6670 | 207 | 403 | 89 |
| 3rd stage effluent | 7.1 | 50 | 2840 | 6340 | 1.5 | 5.6 | 88 |

It can be seen that this second pond water sample behaves similarly to the first pond water, although the starting concentrations vary considerably.

The majority of the phosphate loss occurs in the fluoride removal step, with a significant amount also lost in the calcium removal step.

The amount of fluoride removed in the sodium fluorosilicate recovery step will depend on the initial silica levels. Other jar tests used a pond water sample with a higher Si:F ratio in solution, and resulted in lower F concentrations after the first step.

TABLE 3

Batch feed pilot test results:

|  | $PO_4$—P (mg/L) | Si (mg/L) | F (mg/L) | Ca (mg/L) |
|---|---|---|---|---|
| Raw | 12600 | 1570 | 12400 | 1690 |
| pH 2 | 11100 | 735 | 5800 | 1570 |
| pH 5.5 | 7380 | 42 | 144 | 668 |

TABLE 4

Pilot phosphate recovery results:

|  | Unfiltered P (mg/L) | $PO_4$—P (mg/L) | NH3—N (mg/L) | Mg (mg/L) | Ca (mg/L) | Si (mg/L) |
|---|---|---|---|---|---|---|
| Influent | 6540 | 6400 | 2490 | 3.66 | 119 | 74 |
| Effluent | 442 | 412 | 210 | 1185 | 144 | 29 |
| Effluent | 322 | 221 | 296 | 750 | 144 | 25 |

Fines destruction was tested by acidifying a slurry of pilot phosphate recovery reactor effluent fines (primarily micron sized struvite particles) with sulphuric acid to an endpoint pH of approximately 5.65. This resulted in nearly complete dissolution of the solids present in the slurry along with increased phosphate, ammonia and magnesium concentrations in solution as expected. The acidified solution was then dosed with sodium hydroxide (NaOH) to bring the pH back up to 7.1, and the dissolved struvite fines were re-precipitated as visually larger particles than the original fines sample.

TABLE 5

Fines destruct and re-crystallization trial

|  | pH | PO4—P (mg/L) | NH3—N (mg/L) | Mg (mg/L) |
|---|---|---|---|---|
| Fines slurry | 6.96 | 477 | 104 | 1160 |
| H2SO4 | 5.65 | 2520 | 1000 | 2610 |
| NaOH | 6.69 | 650 | 158 | 1300 |
| NaOH | 7.1 | 418 | 105 | 1125 |

Pilot phosphate recovery stage effluent was settled and decanted. The decanted liquor was then evaporated to approximately 50% volume to produce simulated nanofiltration/reverse osmosis concentrate, and dosed with hydrated lime at Ca:SO4 molar ratios ranging from 0.5:1 to 1.25:1 to produce an alkaline sodium solution for recycling to the pretreatment stages by precipitation of gypsum. Results are shown in Table 6 below. This shows that a lime dose of 0.5:1 or less is likely optimal for this treatment as further lime addition resulted in little further reduction in sulphate concentrations, likely because the elevated pH resulted in limited further lime solubility, and the additional lime simply remained in solid form. Solids formed in this test settled readily within 60 minutes. This test demonstrates that liming of the post-treatment membrane concentrate is an effective means of precipitating gypsum to remove sulphate from solution and creating a sodium solution with a concentration of in excess of 5000 mg/l Na at a pH between 11.7 and 12. The resultant liquor also had relatively low levels of soluble calcium making it suitable for use as a sodium source and an alkalinity source in all but the calcium removal step of pre-treatment.

TABLE 6

Post treatment concentrate liming test results.

|  | Concentrate | Limed Concentrate | | | |
|---|---|---|---|---|---|
| Lime dose (CaSO4 mol ratio) | 6.96 | 0.5 | 0.75 | 1 | 1.25 |
| pH | 6.17 | 11.72 | 11.94 | 11.96 | 11.99 |
| SO4 (mg/L SO4) | 39200 | 26100 | 23550 | 24400 | 22850 |
| Na (mg/L Na) | 5052 | 5174 | 5666 | 5427 | 5640 |
| Ca (mg/L Ca) | 97.4 | 645 | 785 | 760 | 765 |
| Conductivity (uS/cm) | 47300 | 49900 | 59800 | 60600 | 58800 |

The pilot test results are consistent with the jar test results.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations.

What is claimed is:

1. A method for treating phosphate-containing wastewater comprising fluoride, phosphate and silica, the method comprising:
    (a) adding a first cation to the wastewater to precipitate fluorosilicate from the wastewater;
    (b) adding a second cation to the wastewater to precipitate fluoride from the wastewater;
    (c) raising the pH of the wastewater with a calcium-free base to precipitate the second cation from the wastewater;
    (d) removing silica from the wastewater;
    (e) precipitating phosphate from the wastewater;
    (f) polishing the wastewater, comprising subjecting the wastewater to nanofiltration and/or reverse osmosis to obtain a liquid retentate comprising sodium ions and a treated phosphate-containing wastewater permeate;
    (g) recirculating the liquid retentate comprising sodium ions to step (a) to enhance precipitation of fluorosilicate from the wastewater,
    wherein step (e) comprises controllably adding magnesium and/or ammonia to precipitate the phosphate as struvite or a struvite analog.

2. A method according to claim 1 wherein step (a) comprises raising the pH of the wastewater, from a pH lower than 2.0, to about pH 2.0 to precipitate the fluorosilicate.

3. A method according to claim 2 wherein step (a) comprises adding a stoichiometric amount of the first cation to precipitate the fluorosilicate.

4. A method according to claim 2 wherein step (a) comprises adding an excess amount of the first cation to precipitate the fluorosilicate.

5. A method according to claim 1 wherein the first cation comprises a sodium compound and the fluorosilicate comprises sodium fluorosilicate.

6. A method according to claim 1 wherein the first cation comprises a calcium compound and the fluorosilicate comprises calcium fluorosilicate.

7. A method according to claim 1 wherein the first cation comprises a magnesium compound and the fluorosilicate comprises magnesium fluorosilicate.

8. A method according to claim 5 wherein the sodium compound is selected from the group consisting of sodium hydroxide, sodium carbonate, sodium bicarbonate, sodium chloride, and an alkaline sodium solution produced from post treatment of effluent yielded by the method.

9. A method according to claim 8 wherein the sodium compound is alkaline.

10. A method according to claim 2 wherein raising the pH to about 2.0 comprises adding an ammonia source.

11. A method according to claim 10 wherein the ammonia source comprises anhydrous ammonia or ammonium hydroxide.

12. A method according to claim 1 wherein step (a) comprises reducing a fluoride concentration of the wastewater to about 4000 to 5000 mg/L.

13. A method according to claim 12 wherein step (a) comprises reducing a silica concentration of the wastewater to about 500 to 600 mg/L.

14. A method according to claim 5 wherein after step (a) the sodium fluorosilicate is removed from the wastewater by settling.

15. A method according to claim 1 wherein step (b) comprises:
    (b)(i) raising the pH of the wastewater to about pH 3.5 to 4.0;

(b)(ii) maintaining the pH of the wastewater at about pH 3.5 to 4.0;
(b)(iii) raising the pH of the wastewater to about pH 5.5; and
(b)(iv) maintaining the pH of the wastewater at about pH 5.5.

16. A method according to claim 15 wherein the second cation comprises a cation base, wherein steps (b)(i) and (b)(iii) comprise adding the cation base.

17. A method according to claim 16 wherein the cation base is selected from the group consisting of a calcium-containing base and a magnesium-containing base.

18. A method according to claim 15 wherein the cation base is a calcium-containing base.

19. A method according to claim 18 wherein the calcium-containing base comprises lime.

20. A method according to claim 18 wherein the calcium-containing base comprises limestone.

21. A method according to claim 15 wherein step (b)(ii) comprises maintaining the pH of the wastewater at about pH 3.5 to 4.0 for at least 2 hours.

22. A method according to claim 15 wherein step (b)(iv) comprises maintaining the pH of the wastewater at about pH 5.5 for 20 to 30 minutes.

23. A method according to claim 15 wherein step (b)(iv) comprises reducing a fluoride concentration to less than 150 mg/L.

24. A method according to claim 23 wherein step (b)(iv) comprises reducing the fluoride concentration to 50 to 150 mg/L.

25. A method according to claim 15 wherein step (b)(iv) comprises reducing a second cation concentration to about 600 mg/L.

26. A method according to claim 18 wherein the fluoride is precipitated as calcium fluoride.

27. A method according to claim 26 wherein after step (b)(iv), the precipitated calcium fluoride is removed from the wastewater by settling.

28. A method according to claim 18 wherein raising the pH of the wastewater in step (b)(i) and/or step (b)(iii) further comprises adding one or more calcium-free bases in a quantity to meet stoichiometric requirements for precipitating the phosphate in step (e).

29. A method according to claim 28 wherein the one or more calcium-free bases are selected from the group consisting of: magnesium oxide, magnesium hydroxide, ammonium hydroxide and anhydrous ammonia.

30. A method according to claim 28 wherein the calcium free base is sodium hydroxide or a sodium rich alkali solution produced from post treatment of effluent from step (e).

31. A method according to claim 1 wherein step (c) comprises raising the pH of the wastewater to above pH 7.0.

32. A method according to claim 31 wherein step (c) comprises raising the pH of the wastewater to a pH in the range of about pH 7.1 to about pH 7.5.

33. A method according to claim 32 wherein step (c) comprises raising the pH of the wastewater with a precipitating base or a non-precipitating base.

34. A method according to claim 33 wherein the precipitating base comprises ammonia gas (anhydrous ammonia) or ammonium hydroxide.

35. A method according to claim 34 wherein the ammonia gas (anhydrous ammonia) or ammonium hydroxide is added in a quantity to meet stoichiometric requirements for precipitating the phosphate in step (e).

36. A method according to claim 33 wherein the non-precipitating base further comprises sodium hydroxide or a sodium rich alkali solution produced from post treatment of the wastewater from step (e).

37. A method according to claim 1 wherein the precipitated second cation is removed by settling.

38. A method according to claim 1 wherein step (d) comprises:
(d)(i) aging the wastewater to allow the silica to form a gel;
(d)(ii) mixing the gel;
(d)(iii) allowing the silica to settle; and
(d)(iv) removing the settled silica.

39. A method according to claim 38 wherein step (d)(i) comprises aging the wastewater for 8 to 12 hours.

40. A method according to claim 1 wherein step (e) further comprises maintaining a pH of between about 6.5 to 7.5.

41. A method according to claim 40 wherein maintaining the pH of between about 6.5 and 7.5 comprises adding sodium hydroxide or a sodium rich alkali solution produced from post treatment of effluent yielded by the method.

42. A method according to claim 1 wherein step (e) comprises maintaining a concentration of phosphate higher than concentrations of the magnesium and the ammonia.

43. A method according to claim 42 wherein the magnesium in step (e) is selected from the group consisting of magnesium oxide, magnesium hydroxide, magnesium sulphate, and magnesium chloride.

44. A method according to claim 42 wherein the ammonia in step (e) comprises ammonium hydroxide or anhydrous ammonia.

45. A method according to claim 1 further comprising recovering fine particulates of the precipitated phosphate from step (e).

46. A method according to claim 45 wherein the precipitated phosphate is recovered by a settling or thickening device.

47. A method according to claim 45, further comprising dissolving settled and thickened fines by adding a mineral acid to form a phosphate-rich liquor and returning the phosphate-rich liquor to step (e) for phosphate re-crystallization.

48. A method according to claim 47 wherein the mineral acid comprises sulphuric acid.

49. A method according to claim 47 comprising reducing a pH of a slurry of the thickened fines to about 3.0 to 6.0 by addition of the mineral acid, resulting in the dissolution of substantially all the thickened fines.

50. A method according to claim 1 wherein step (f) comprises raising the pH of the wastewater to between about 9.0 and 11.0.

51. A method according to claim 50 wherein raising the pH of the wastewater to between about 9.0 and 11.0 comprises adding lime.

52. A method according to claim 51 wherein lime sludge generated by step (f) is recycled to step (b).

53. A method according to claim 1 comprising reacting the liquid retentate from step (f) with lime or a calcium rich alkali substance to precipitate gypsum and produce a sodium rich alkali solution.

54. A method according to claim 53 comprising separating the precipitated gypsum and any unreacted lime from the sodium rich alkali solution in a solids-liquid separation device.

55. A method according to claim 54 comprising recirculating a slurry of the precipitated gypsum and any unreacted lime to step (b) as a source of calcium.

56. A method according to claim 54 comprising controlling the efficiency of the solids-liquids separation device to control flow split between a slurry of solids and a clarified sodium rich alkali solution to direct sufficient slurry to step (b) for both a calcium source and alkalinity while the clarified sodium rich alkali solution is used as a sodium and alkalinity source for step (a) and optionally as an alkalinity source for steps (c) and/or (d).

57. A method according to claim 1 wherein step (e) comprises controllably adding a third cation and/or a fourth cation to precipitate the phosphate as a struvite analog.

58. A method according to claim 57 wherein the struvite analog comprises iron ammonium phosphate.

59. A method according to claim 1 wherein step (e) is performed in a recirculating crystallizer and includes harvesting particles of the struvite or struvite analog from the recirculating crystallizer.

\* \* \* \* \*